Dec. 21, 1948.  E. F. HARDEY  2,456,781
BLOWER TYPE RADIANT HEATER
Filed Oct. 5, 1945  2 Sheets—Sheet 1
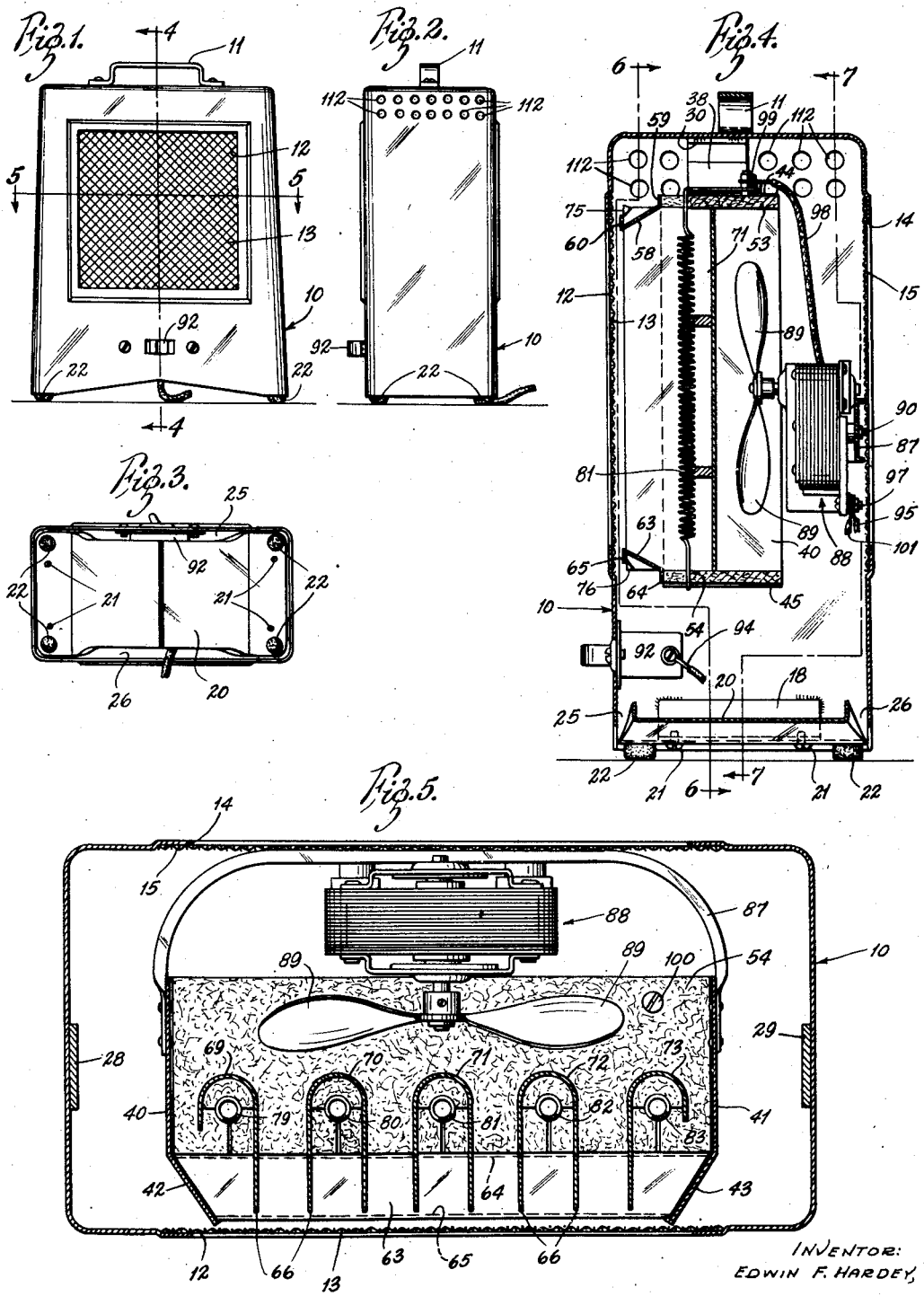

Dec. 21, 1948.  E. F. HARDEY  2,456,781
BLOWER TYPE RADIANT HEATER
Filed Oct. 5, 1945  2 Sheets-Sheet 2
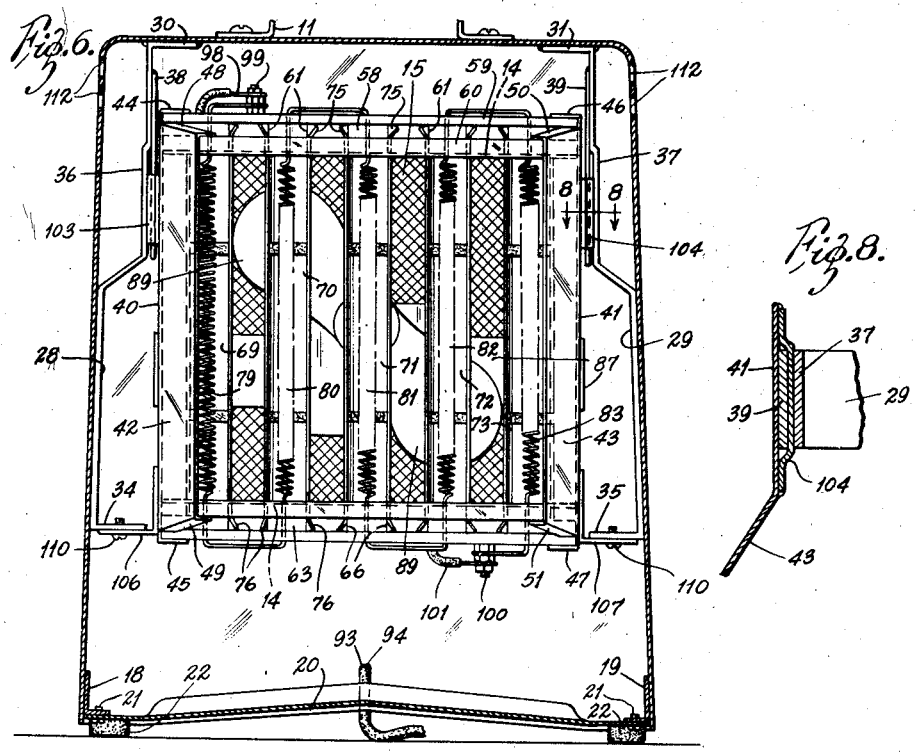
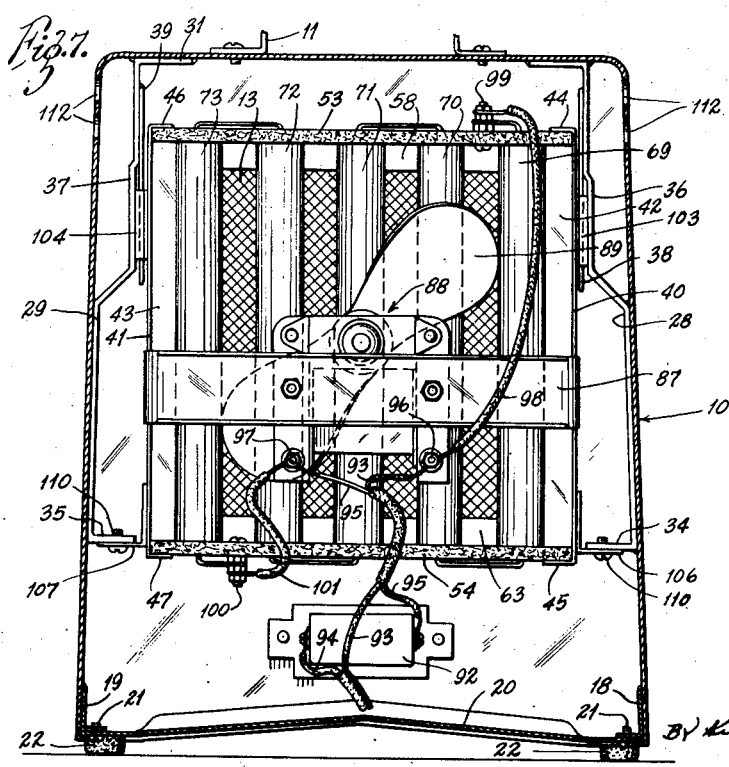
INVENTOR:
EDWIN F. HARDEY,
ATTORNEYS.

Patented Dec. 21, 1948

2,456,781

UNITED STATES PATENT OFFICE 2,456,781

BLOWER TYPE RADIANT HEATER

Edwin F. Hardey, Kansas City, Mo., assignor to The Emerson Electric Manufacturing Company, St. Louis, Mo., a corporation of Missouri Application October 5, 1945, Serial No. 620,542

6 Claims. (Cl. 219—39)

1

The present invention relates to a heater. More particularly, it relates to a heater of the unit type having electric heating elements and a fan.

It is an object of the invention to provide a heater of the foregoing type which combines the delivery of radiant heat with the delivery of heated forced draft air currents.

More particularly, it is an object to provide a series of heating elements having individual reflectors behind them, the reflectors being spaced to provide air flow paths between them, in combination with a blower disposed behind the reflectors to draw air in and force it outwardly between the reflectors, it being heated from them as it passes by.

A further object of the invention is to provide a unit heater of the foregoing type which is compact in construction and possesses features that make it easily manufactured and easily assembled.

In the drawings:

Fig. 1 is a front elevation of a heater;

Fig. 2 is a side elevation thereof, taken from the right side of Fig. 1;

Fig. 3 is a bottom view of the heater;

Fig. 4 is a vertical section, taken on the line 4—4 of Fig. 1;

Fig. 5 is a horizontal section, taken on the line 5—5 of Fig. 1;

Fig. 6 is a vertical broken section, taken on the line 6—6 to the left of Fig. 4;

Fig. 7 is a vertical broken section, taken on the line 7—7 to the right of Fig. 4; and Fig. 8 is a fragmentary horizontal section, taken on the line 8—8 of Fig. 6.

As shown in Fig. 1, the heater is formed as a compact unit. It is mounted within a casing generally indicated at 10, having a handle 11 at the top thereof, a grilled opening 12 in the front covered by an open grill 13, and a similar opening 14 in the rear covered by a grill 15.

The casing, here shown as open at its bottom, is provided with angle irons 18 and 19 at its lower side edges, each providing a ledge extending inwardly from the casing a short distance. A bottom plate 20 is attached by screws 21 to the horizontal flanges of the angle irons 18 and 19. The bottom plate has feet 22 thereon to provide support for the entire unit.

Preferably, the bottom plate 20 is bent to a slope such as shown in Figs. 6 and 7 to conform to the slope of the related parts of the outer casing 10, as shown in Fig. 1. The medial part of the edges of the plate 20 is spaced inwardly from the walls of the casing to provide air passages 25 and 26, as shown in Fig. 4.

On opposite sides of the interior of the casing two brackets 28 and 29 are disposed. These brackets are bent over at their top ends 30 and 31, respectively, which ends are welded or otherwise secured to the top of the casing 10. The brackets also may be secured to the side walls of the casing. It will be seen that they extend substantially vertically downwardly from their upper ends 30 and 31 in a manner to provide upper parts that are spaced inwardly from the sides of the casing. Then they are bent outwardly and lie alongside the casing walls, as shown. Their bottom parts are inturned at 34 and 35 to provide bottom attachment ledges, as will appear. At their top vertical parts, they have offsets 36 and 37, paralleling which are strips 38 and 39. The strips 38 and 39 are secured at their upper ends to the brackets 28 and 29 and extend downwardly in spaced relation to the two offsets 36 and 37 to provide attachment tongues, as will appear.

An inner frame includes two side pieces 40 and 41 made of sheet metal. These pieces are inturned at their forward edges 42 and 43.

The side member 40 has upper and lower inturned portions 44 and 45. The side piece 41 has upper and lower inturned portions 46 and 47. The forward sloping portion 42 has upper and lower inturned flanges 48 and 49. The sloping portion 43 has upper and lower inturned flanges 50 and 51.

The top of the inner frame consists of a piece of rigid heat insulating material 53 secured as by rivets to the two inturned flanges 44 and 46 on the two side pieces 40 and 41. The bottom of the inner casing is, in similar manner, formed from a rigid insulating member 54 attached to the two inturned flanges 45 and 47 of the two side pieces 40 and 41.

The top flanges 48 and 50 of the inturned forward parts of the two side pieces 42 and 43 are adapted for engagement with a top strip 58. The cross-sectional shape of this top strip appears in Fig. 4. It has a back flange 59 engageable with the edge of the top piece 53 and a forward flange 60 that faces the front opening 12. Between these two flanges, it has a series of slots 61.

A similar bottom strip 63 is similarly flanged at 64 and 65. Between its flanges, it has slots 66 that are aligned vertically below the slot 61 in the upper strip.

A series of generally U-shaped reflectors 69, 70, 71, 72 and 73 are disposed between the bottom and the top of the inner frame. Their forward, upper and lower edges extend into the upper slots 61 and the lower slots 66 on the two front strips 58 and 63, as appears most clearly in Figs. 4 and 6. The projecting ears 75 may be bent over to prevent accidental withdrawal of these reflectors. The two end reflectors 69 and 73 have only one arm projecting forwardly to engage in the slots. The two upper and lower strips 58 and 63 are held in position by the bent over tabs 75 and 76 of the reflectors and by their engagement with the flanges 48, 49, 50 and 51 on the forward sloping parts of the side pieces and by their front and back flanges 59, 60, 64 and 65. The reflectors have vertical stability by their interfitting closely between the top and bottom insulating members 53 and 54.

A plurality of heating coils 79, 80, 81, 82 and 83 are disposed within the several reflectors 69—73. The back parts of the reflectors are curved, and may be formed as semi-circles in the manner shown, or into other suitable shapes. The centers of the coils are preferably located at the foci of the reflectors. These electric heating coils are connected in series, their leads running over the insulating top and bottom members 53 and 54 which are not only heat insulating material but also electrically insulating material.

A fan supporting beam or bracket 87 is supported at its ends on the two side pieces 40 and 41. It extends back of the inner frame and supports a fan motor 88 which has fan blades 89 mounted on the shaft thereof and disposed centrally back of the several reflectors 69—73. This motor is removably bolted at 90 to the bracket 87.

A switch 92 is removably mounted on the front wall of the casing 10 below the opening 12, so that its operating button extends at the front of the heating unit. The power line consists of a pair of wires 93 and 94. The wire 94 is connected through the switch 92 and continues therefrom as a line 95. The line 93 is connected to a terminal 96 on the back of the fan motor, the line 95 connected to a similar terminal 97. The heaters are connected in parallel by a first connection 98 leading from the motor terminal 96 to a terminal 99 on the member 53 which is connected to the inlet side of the several heaters. The outlet side of the several heaters is connected to a terminal 100, from which a lead 101 leads to the terminal 97. It will thus be seen that when the switch is turned on both the fan and the heaters operate in parallel.

The inner frame side members have eye brackets 103 and 104 welded or otherwise secured toward the upper part of the two side members 40 and 41. These brackets are disposed to receive the depending strips 38 and 39. By this means, the inner frame can be inserted through the bottom of the casing upwardly to interengage with the two depending members 38 and 93 and be secured at its top. The inner frame is also secured removably against coming out by angle brackets 106 and 107 that are engageable with the two bottom portions 34 and 35 of the brackets 30 and 31 by screws 110.

The operation of the heater should be clear from the foregoing description. When the switch is turned on, power is supplied both to the fan motor and to the several heating elements 79—83. The latter heat up and radiant heat therefrom is reflected by the inner surfaces of the reflector forwardly through the opening 12. At the same time, air is drawn in through the rear opening 14 and is forced by the fan 89 outwardly from the front of the unit. In its travel, it passes by the reflectors 69—73 and is in intimate contact therewith. It will be seen that there are a plurality of air passages around the several reflectors, so that they may act as heat radiators for radiant heat and also as heat transfer members for heating the air forced past them by the fan.

The assembly of the device is simple. The inner frame is made as a separable unit. Initially, the two side frame members 40 and 41, with the attached bracket 87, and the two top members 53 and 54 are secured together. The bracket 87 adds to the rigidity of this structure. The reflectors may be inserted from the rear prior to the bending over of their tabs 75. They fit between the bottom and top members and project through the slots of the flanged strips 58 and 63. The tabs 75 may be bent over to secure the reflectors in their assembled position.

The several heating elements are preferably mounted between the upper and lower frame members 53 and 54 prior to installation of the reflectors.

The fan motor may be mounted to hold the fan in place and the electrical connections made. This completes the fan and heater assembly with the inner frame, as a unit.

Thereafter, the inner frame is inserted through the open bottom of the casing, so that its brackets 104 engage over the depending strips 38 and 39. Then the screws 110 are inserted through the lower angle irons 106 and 107 to support the frame against any removal. The switch may be secured in position and the bottom applied by the screws 21.

The heat rising from the heater elements is only poorly transmitted through the upper member 53, so that the handle 11 does not get as hot as it would if the reflectors were in contact with the top of the frame. Also, it will be seen that an air space exists above the top of the frame and a plurality of holes 112 are disposed in the upper corners of the sides of the frame through which air may be drawn by the fan to assist in cooling the top of the casing.

What is claimed is:

1. In a heater, a frame having four sides, a plurality of elongated heating coils extending between two sides and arranged in spaced relation across the frame, a plurality of substantially impervious elongated reflectors of heat conducting material having rounded backs and forwardly extending side walls shaped with respect to the heating elements to reflect heat from the elements forwardly through the front of the frame, one reflector being associated with each heating coil, said reflectors extending at least substantially the full length of the coils and opening forwardly of the frame, the side walls of adjacent reflectors being directed forwardly of the casing and spaced to provide air passages that can discharge forwardly toward the front opening, a fan support on the frame, a fan supported thereon behind the reflectors and positioned to direct air against the back walls of the reflectors and through the air passages, said frame and the foregoing parts being assembled as a unit, a casing having an opening, the assembled unit being insertable into the casing to discharge heat from the opening, and means to secure the assembled unit in the casing.

2. In a heater, a frame having four sides, a plurality of elongated heating coils extending between two sides and arranged in spaced relation across the frame, a plurality of substantially impervious elongated reflectors of heat conducting material having rounded backs and forwardly extending side walls shaped with respect to the heating elements to reflect heat from the elements forwardly through the front of the frame, one reflector being associated with each heating coil, said reflectors extending at least substantially the full length of the coils and opening forwardly of the frame, the side walls of adjacent reflectors being directed forwardly of the casing and spaced to provide air passages that can discharge forwardly toward the front opening, a fan support on the frame, a fan supported thereon behind the reflectors and positioned to direct air against the back walls of the reflectors and through the air passages, said frame and the foregoing parts being assembled as a unit, a casing having an opening, the assembled unit being insertable into the casing to discharge heat from the opening, means to secure the assembled unit in the casing, said last named means including fixed interlocking means between one side of the frame and the casing from which the frame may be removed in one direction, and removable means to secure the frame against such removal.

3. In a blower type radiant heater, a casing having an outlet opening in its front and an inlet separated from the inlet opening, resistance heating means in the casing having a plurality of separate heating portions in the casing and spaced across the front opening, reflector means in the casing providing a plurality of reflector elements of heat conducting material, one behind each heating portion, each element having an inner, at least substantially impervious, concave reflector surface behind its heating portion shaped with respect to the heating element to reflect heat from the heating element out the front opening of the casing, and adjacent reflector elements having sides in spaced relation and shaped to provide air passages opening toward the front opening of the casing, and a blower in the casing adapted to draw air in the inlet, and to blow air against the backs of the reflector elements, through the several air passages, and out the front opening of the casing.

4. In a blower type radiant heater, a casing having an outlet opening in its front and an air inlet separate from the outlet opening, resistance heating means in the casing having a plurality of separate heating portions in the casing and spaced across the front opening, reflector means in the casing providing a plurality of reflector elements of heat conducting material, one behind each heating portion, each element having an inner, at least substantially impervious, concave reflector surface behind its heating portion shaped with respect to the heating element to reflect heat from the heating element out the front opening of the casing, and having side edges extending forwardly toward the front opening, adjacent reflector elements having their adjacent side edges spaced from each other to provide air passages from rear to front and shaped to discharge air toward the front opening of the casing, and a blower in the casing adapted to draw air in the inlet, and to blow air against the backs of the reflector elements, through the several air passages, and out the front opening of the casing.

5. In a blower type radiant heater, a casing having an outlet opening in its front and an inlet separate from the outlet opening, resistance heating means in the casing having a plurality of separate heating portions in the casing and spaced across the front opening, reflector means in the casing providing a plurality of reflector elements of heat conducting material, one behind each heating portion, each element having an inner, at least substantially impervious, concave reflector surface behind its heating portion shaped with respect to the heating element to reflect heat from the heating element out the front opening of the casing, with convex back surfaces directed toward the back of the casing, and having side edges extending forwardly toward the front opening, adjacent reflector elements having their adjacent side edges spaced from each other to provide air passages from rear to front and shaped to discharge air toward the front opening of the casing, and a blower in the casing adapted to draw air in the inlet, and to blow air against the backs of the reflector elements, through the several air passages, and out the front opening of the casing.

6. In a blower type radiant heater, a casing having an outlet opening in its front and an inlet separate from the outlet, resistance heating means in the casing having a plurality of separate heating portions in the casing and spaced across the front opening, reflector means in the casing providing a plurality of reflector elements of heat conducting material, one behind each heating portion, each element being formed of sheet metal curved in cross section to provide an inner, at least substantially impervious, concave reflector surface behind its heating portion shaped with respect to the heating element to reflect heat from the heating element out the front opening of the casing, and adjacent reflector elements having sides in spaced relation and shaped to provide air passages opening toward the front opening of the casing, and a blower in the casing adapted to draw air in the inlet, and to blow air against the backs of the reflector elements, through the several air passages, and out the front opening of the casing.

EDWIN F. HARDEY.

REFERENCES CITED

The following references are of record in the file of this patent:

UNITED STATES PATENTS

| Number | Name | Date |
|---|---|---|
| 1,908,559 | Roser | May 9, 1933 |
| 1,942,758 | Jessup | Jan. 9, 1934 |
| 2,015,251 | Browning | Sept. 24, 1935 |
| 2,274,469 | Booth | Feb. 24, 1942 |
| 2,303,447 | Fay et al. | Dec. 1, 1942 |